United States Patent
Miao et al.

(10) Patent No.: US 7,442,542 B2
(45) Date of Patent: Oct. 28, 2008

(54) SHALLOW MULTI-WELL PLASTIC CHIP FOR THERMAL MULTIPLEXING

(75) Inventors: Yubo Miao, Singapore (SG); Yu Chen, Singapore (SG); Tit Meng Lim, Singapore (SG); Chew Kiat Heng, Singapore (SG)

(73) Assignees: Agency for Science, Technology and Research, Singapore (SG); National University of Singapore, Singapore (SG)

( * ) Notice: Subject to any disclaimer, the term of this patent is extended or adjusted under 35 U.S.C. 154(b) by 705 days.

(21) Appl. No.: 10/613,599

(22) Filed: Jul. 3, 2003

(65) Prior Publication Data
US 2004/0191896 A1    Sep. 30, 2004

Related U.S. Application Data

(60) Provisional application No. 60/456,929, filed on Mar. 24, 2003.

(51) Int. Cl.
*C12M 1/02* (2006.01)
*C12M 1/40* (2006.01)
*C12P 19/34* (2006.01)
*B28B 7/30* (2006.01)
*B29C 43/56* (2006.01)
*B29C 51/14* (2006.01)
*G01N 1/44* (2006.01)

(52) U.S. Cl. .............. 435/288.4; 435/91.2; 435/303.1; 435/305.2; 435/809; 422/102; 422/943; 436/809; 436/174; 264/313; 264/511; 264/550; 264/570

(58) Field of Classification Search .............. 264/550, 264/551, 570, 511; 435/303.1, 809, 288.4, 435/91.2, 305.2; 436/174, 809; 422/943
See application file for complete search history.

(56) References Cited

U.S. PATENT DOCUMENTS

| | | | |
|---|---|---|---|
| 4,613,393 A | 9/1986 | Cattanach et al. | 156/323 |
| 5,447,679 A | 9/1995 | Eigen et al. | 264/544 |
| 5,646,039 A | 7/1997 | Northrup et al. | 435/287.2 |
| 5,939,312 A | 8/1999 | Baier et al. | 435/287.2 |
| 6,556,940 B1 * | 4/2003 | Tretiakov et al. | 702/130 |
| 6,558,947 B1 * | 5/2003 | Lund et al. | 435/303.1 |
| 2002/0072096 A1 | 6/2002 | O'Keefe et al. | 435/91.2 |

FOREIGN PATENT DOCUMENTS

| | | | |
|---|---|---|---|
| EP | 1000661 A1 | | 5/2000 |
| JP | 04008513 A | * | 1/1992 |
| JP | 09234751 | | 3/1996 |
| WO | WO93/09872 | | 5/1993 |
| WO | WO0240158 A2 | | 5/2002 |
| WO | WO03/059518 | | 7/2003 |

* cited by examiner

*Primary Examiner*—William H Beisner
(74) *Attorney, Agent, or Firm*—Saile Ackerman LLC; Stephen B. Ackerman

(57) ABSTRACT

Disposable units in current use for performing PCR are limited by their heat block ramping rates and by the thermal diffusion delay time through the plastic wall as well as by the sample itself. This limitation has been overcome by forming a disposable plastic chip using a simple deformation process wherein one or more plastic sheets are caused, through hydrostatic pressure, to conform to the surface of a suitable mold. After a given disposable chip has been filled with liquid samples, it is brought into close contact with an array of heating blocks that seals each sample within its own chamber, allowing each sample to then be heat treated as desired.

20 Claims, 4 Drawing Sheets

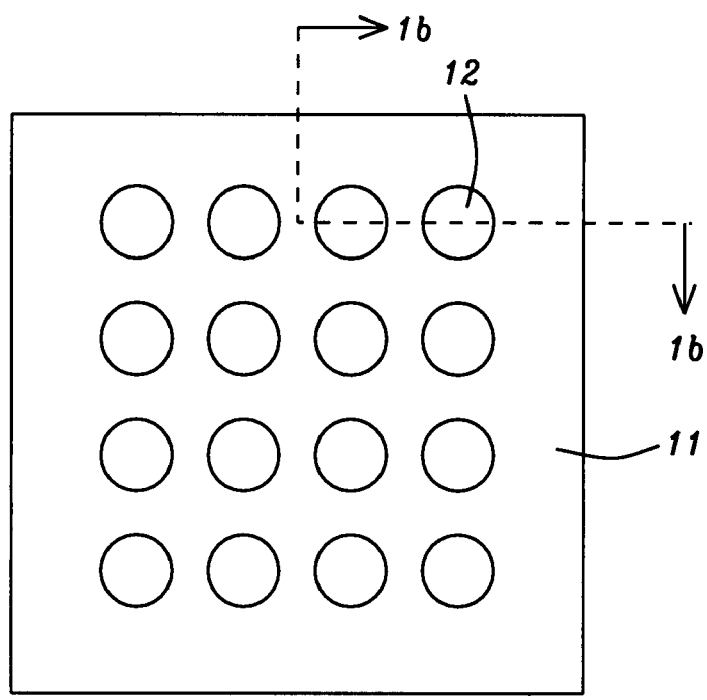
*FIG. 1a – Prior Art*
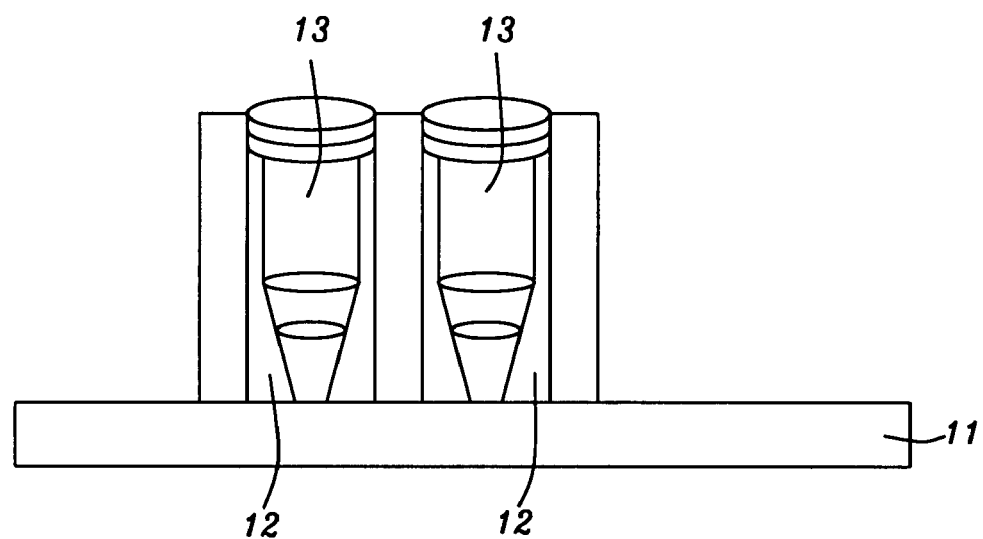
*FIG. 1b – Prior Art*

US 7,442,542 B2

SHALLOW MULTI-WELL PLASTIC CHIP FOR THERMAL MULTIPLEXING

This application claims priority to U.S. Provisional Patent Application Ser. No. 60/456,929, filed on Mar. 24, 2003, which is herein incorporated by reference.

FIELD OF THE INVENTION

The invention relates to the general field of simultaneously heating multiple micro-specimens with particular reference to polymerase chain reactions.

BACKGROUND OF THE INVENTION

The polymerase chain reaction (PCR) is a widely used technique in biology. Conventional PCR instruments consist of plastic plates and hot plates. The plastic plates house multiple tubes that serve as reaction chambers and are placed on the hot plates for thermal cycling. PCR amplification is very slow due to the large sample volumes as well as the thick walls of the plastic tubes. Only a single protocol can be performed each time. Development of a new generation PCR has focused on rapid, multi-chamber, independent control PCR.

An important advantage of miniaturized PCR is fast speed. It has been shown that quick and accurate thermal cycling can be readily achieved, with very small sample volume consumption, by using micro-PCR techniques (1). Most of the recently developed micro-PCR equipment has been fabricated using microelectronic techniques which are in widespread use for the manufacture of integrated circuits (ICs) for semiconductor and micro-electromechanical (MEMS) systems. Reaction chamber, heat sources, and temperature sensors are integrated on a silicon substrate which has excellent thermal properties.

However, due to the high grade materials and sophisticated processing that are involved, micro-PCR equipment of this type tends to be expensive, making it unsuitable for use in environments, such as biomedical applications, in which a disposable chip is usually required.

Baier [2] has shown that a low cost multi-chamber thermal cycler, using the same thermal protocols possible in silicon, can be developed. Plastics have been investigated for use in disposable micro-PCR, but plastics have only fair thermal conductivity compared to silicon which might result in a slow thermal response and poor temperature uniformity.

An ultra thin-walled multi-well plate for thermal cycling has been described by Tretiakov and Saluz (3). The thin wall (30-50 μm) reduced the thermal delay through the wall efficiently but use of a tube-like (V) shape for the chamber itself increased the thermal delay, thick samples being the dominant source of this delay. Another drawback of the tube approach is evaporative loss from the sample due to the presence of air in the tube. An example of this type of structure is schematically illustrated in FIGS. 1a and 1b where FIG. 1b is a cross-section of part of FIG. 1a. FIG. 1a shows an array of tube holders 12 distributed over the surface of heating block 11. As seen in FIG. 1b, each tube holder allows a disposable sample tube 13 to be kept in position close to heater 11.

In designs such as that shown in FIG. 1b, PCR speed is limited by the heat block ramping rate and the thermal diffusion delay time through the plastic wall as well as the sample itself. A similar approach has been described by Icke et al. (4). The air gap is miniaturized with an appropriate large thermal contact using a U shaped chamber. O'Keefe et al. disclose a multi-chamber plate where each chamber is fully filled by a sample without any air (5). However, said chamber is open on two sides, making full sealing for the reaction questionable. It is suitable for sample handling rather than for use as a reaction chamber. The preferred application of both the above designs is for a single protocol.

The present invention discloses a low cost disposable plastic chip that is well suited for use as a multiplexing thermal cycler.

REFERENCES

1. M. Allen Northrup, et al, "Microfabricated reactor", U.S. Pat. No. 5,646,039, Jul. 8, 1997.
2. Baier Volker, et al, (Jena Germany), "Miniaturized multi-chamber thermocycler", U.S. Pat. No. 5,939,312, Aug. 17, 1999.
3. Alexandre Tretiakov, et al, "Ultrathin-walled multiwell plate for heat block thermo-cycling", EP 1 000 661 A1, May 17 2000.
4. Richard ICKE, et al, "Reactor plate", WO 02/40158 A2, May 23, 2002
5. Mattew O'Keefe, et al, "Apparatus and methods for parallel processing of micro-volume liquid reactions", US 2002/0072096 A1, Jun. 12, 2002.

SUMMARY OF THE INVENTION

It has been an object of at least one embodiment of the present invention to provide a disposable plastic chip for use in performing multiple simultaneous polymerase chain reactions.

Another object of at least one embodiment of the present invention has been to provide a process for effectively using said disposable plastic chip.

These objects have been achieved by forming said disposable plastic chip through a simple deformation process wherein one or more plastic sheets are caused, through hydrostatic pressure, to conform to the surface of a suitable mold. After a given disposable chip has been filled with liquid samples, it is brought into close contact with an array of heating blocks that seals each sample within its own chamber, allowing each sample to then be heat treated as desired.

BRIEF DESCRIPTION OF THE DRAWINGS

FIGS. 1a and 1b illustrate the prior art.

DESCRIPTION OF THE PREFERRED EMBODIMENTS

The present invention discloses a multi-well plastic chip, which is optimized for thermal performance and with a fluidic manifold for thermal cycling. More specifically, it concerns a thin and shallow multi-well chip with depth of not more than 0.5 mm. A given sample will fully fill its chamber, forming, in effect, a thin film sample layer. Relative to a silicon multi-chamber thermal cycler, the ramping speed of the present invention is faster (due to the geometry and small size of each chamber). The thin wall of the plastic chip in this invention reduces thermal diffusion delay time effectively. The thin wall of 200 µm can give less than 0.5 seconds of delay time compared with conventional PCR plate of few seconds. The shallow well of 400 µm sample "film" gives 1 second of delay time. The total delay time in a shallow/thin well is up to 50 times less than in the tube. Another drawback of tube is the air gap inside the well, which influences sample reaction due to sample evaporation. It also limits the minimum volume that can be used in a tube. In this invention the air gap is eliminated The plastic chip of this invention can be used for independently controlled thermal cycling. Thermal cross talk between chambers is minimized by the thin cross-section of the connections between wells. This gives better temperature uniformity (<0.5 C) and more precise temperature control (0.1 C) for each well.

For this technology, the Influence of bubbles can be significant. It results in poor temperature uniformity and builds high pressure inside the chambers. The present invention employs micro-channels to eliminate the generation of bubbles during sample injection. Samples load/unloaded through the micro-channels will be bubble free. Since micro-channels give a uniform distributed flow. How wells are sealed is also very important because the sealing means are directly exposed to the solution. Normal tape, for example, is not the solution-resistant.

Thermal bonding or welding techniques are better suited to chip sealing. Hot lid sealing is another popular technique for tube plastic plates. It needs to be kept within a certain temperature range to protect against evaporation. However, any modification of the present invention that involves attaching additional parts to the plastic chip will change the thermal profile significantly. Double sided thermal cycling of the plastic chip can be used in the current case. The sealing force can be applied through the top thermal cycler.

Plastic thermal forming technology is used to prepare the plastic chip in this invention. Conventional plastic forming technology includes mold injection, hot embossing and vacuum thermal forming. The forming technology used here differs from, and improves over, vacuum thermal forming. Through this method, a molding force greater than 1 atmosphere (which is the maximum achievable with vacuum forming) can be applied to the thin plastic.

Figure 2:
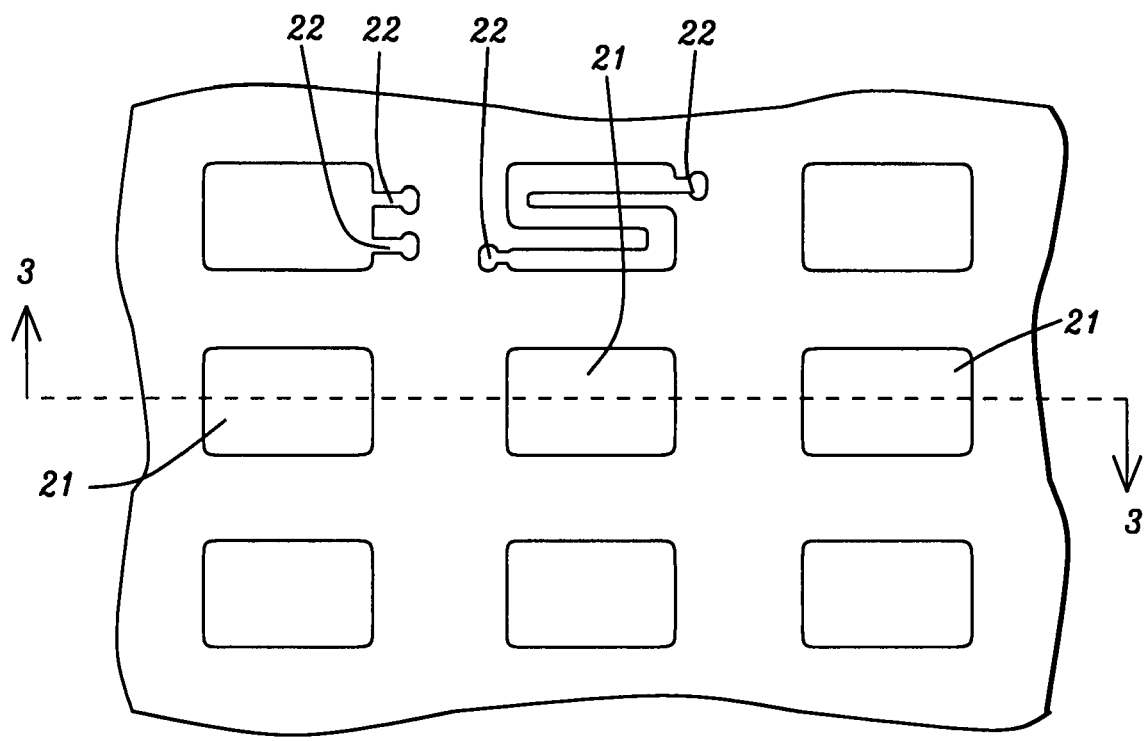
FIG. 2 is a plan view of the disposable plastic chip disclosed in the present invention.
Figure 3:
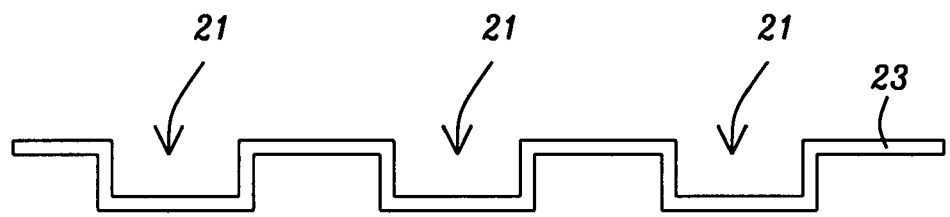
FIG. 3 is a cross-section taken through FIG. 2.

Referring now to FIG. 2, we show there a plan view of a portion of a single chip while FIG. 3 represents a cross-section taken along line 3-3. As can be seen, the chip comprises an array of depressions 21, each such depression being intended for use as a sample chamber. Also shown in FIG. 2 are micro-channels 22 that are used for loading and unloading liquid sample into and out of the chambers 21. Many designs for such micro-channels are possible, the two that appear in FIG. 2 being simply examples. By using micro-channels to load and unload liquid, bubble formation is eliminated because of smoother and more uniform flow.

The cross-sectional view of the disposable chip that is seen in FIG. 3 illustrates several important features of the present invention:

(1) The low thickness of plastic sheet 23 (less than about 200 microns) ensures good thermal isolation between wells 21; relative to all neighboring heat sources, each chamber has a thermal conductance that is less than about 50-70 $WK^{-1}$.

(2) The shallow depth (less than about 500 microns) of wells 21 implies that they hold only a small volume of sample liquid, while presenting a large surface area, so heat transfer into and out of the liquid in the well can be very rapid, each chamber having a thermal conductance of about $2-4 \times 10^3$ $WK^{-1}$. The thin wall of the well means a short thermal diffusion path from heat source (bottom) through the solution to surface.

(3) There is sufficient surface material between the wells to allow the wells to be properly sealed in a single operation (see below).

(4) Since very little plastic is needed and the process to form the chips is not expensive (see below) it is economical to dispose of the entire chip after a single use.

Figure 4:
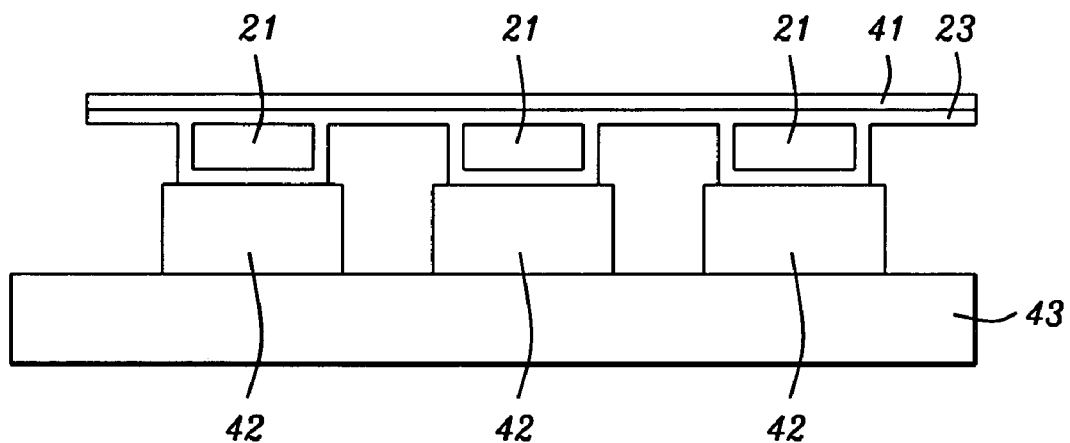
FIG. 4 illustrates a first embodiment wherein each chamber rests on a heating block but are not heated from above.

Referring now to FIG. 4, we show a first embodiment of a process for multi-chamber thermal multiplexing using the above-described disposable chip. Chip 23 is placed on an array of heating blocks 42, that share a common substrate 43, and bonded thereto to ensure good heat transfer. Our preferred bonding method for this has been flip chip bonding technology. The size and spacing of heating blocks 42 matches that of chambers 21.

After chambers (or wells) 21 have been filled with liquid samples, cover slip 41 is bonded to the top surface of 23 to ensure that each liquid sample is completely sealed within its own chamber. For this sub-process, our preferred cover slip materials has been any biocompatible thin sheet while our preferred bonding method has bee thermal bonding. The chamber is sealed first, leaving inlets and outlets at the channel end for sample loading. These inlet and outlet holes could connect to short tubing and be covered by oil to eliminate evaporation.

Then, with the samples safely sealed, the heating blocks 42 are used to heat the liquid samples. Time and/or temperature may be customized for each sample as needed and the composition of the samples may vary from one well to the next, should this be needed. When all samples have been heat treated, cover slip 41 is detached from chip 23 by heating. The samples are individually removed, using the micro-channels, for further processing.

Chip 23 is then separated from heating blocks 42 by hand. This feasible because thermal grease is used for the contact.

Figure 5:
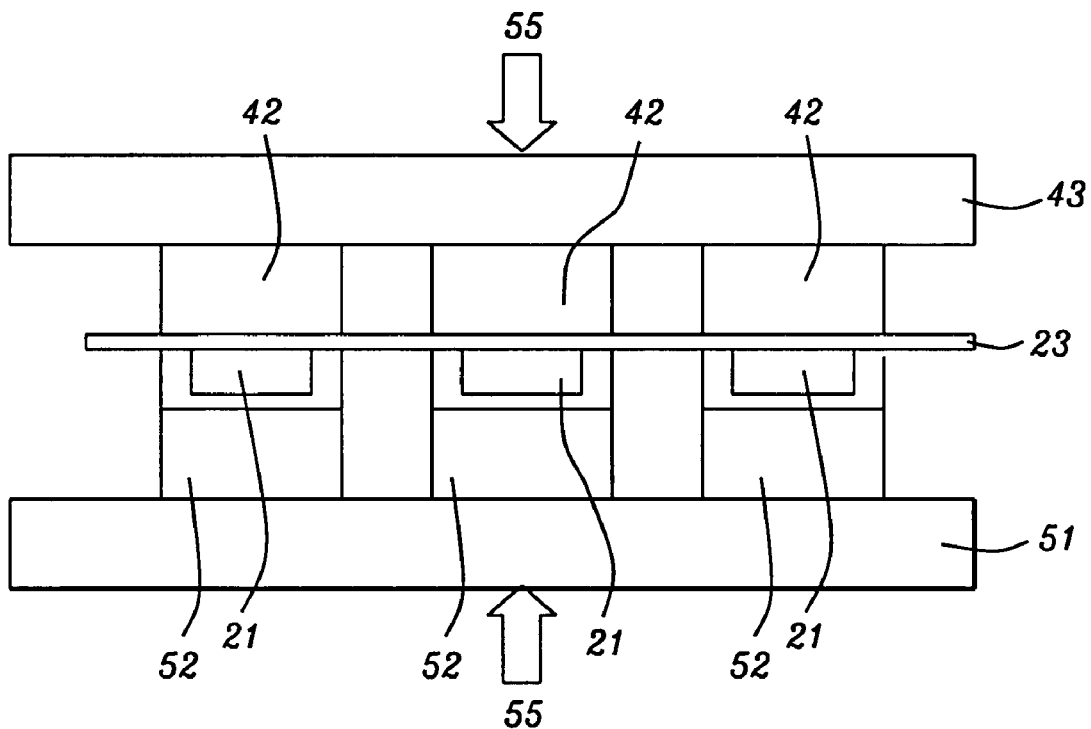
FIG. 5 illustrates a second embodiment wherein each chamber rests on a heat sink/source and is heated from above by a heating block

Referring now to FIG. 5, we show a second embodiment of a process for multi-chamber thermal multiplexing using the disposable chip. An array of heat sinks 52, whose size and spacing matches that of the multi-chamber array and that share a common substrate 51, is provided. Each heat sink 52 includes in its top surface a cavity into which one of said wells just fits so that each well can be inserted into a corresponding cavity, thereby ensuring good heat transfer between elements 21 and 52.

After filling chambers 21 with their liquid samples, heating block array 42 (whose size and spacing matches that of the multi-chamber array) is placed in contact with the latter so that each liquid sample is completely isolated within its own chamber. Then, uniform pressure 55 is applied and maintained between the heat sink and heating block arrays, thereby ensuring good heat transfer between them and the liquid samples in wells 2, following which heating blocks 42 are used to heat said liquid samples.

Note that heat sinks 52 may also be made to serve as heat sources, either exclusively or temporarily, to further reduce the time needed to raise the liquid samples to their required temperatures.

As in the first embodiment, time and/or temperature may be customized for each sample as needed and the composition of the samples may vary from one well to the next, should this be needed. When all samples have been heat treated, pressure 55 is terminated so blocks 42 and 52 are readily separated from chip 23 thereby allowing the liquid samples to be accessed and individually removed for further processing, following which chip 23 may be discarded.

Figure 6:
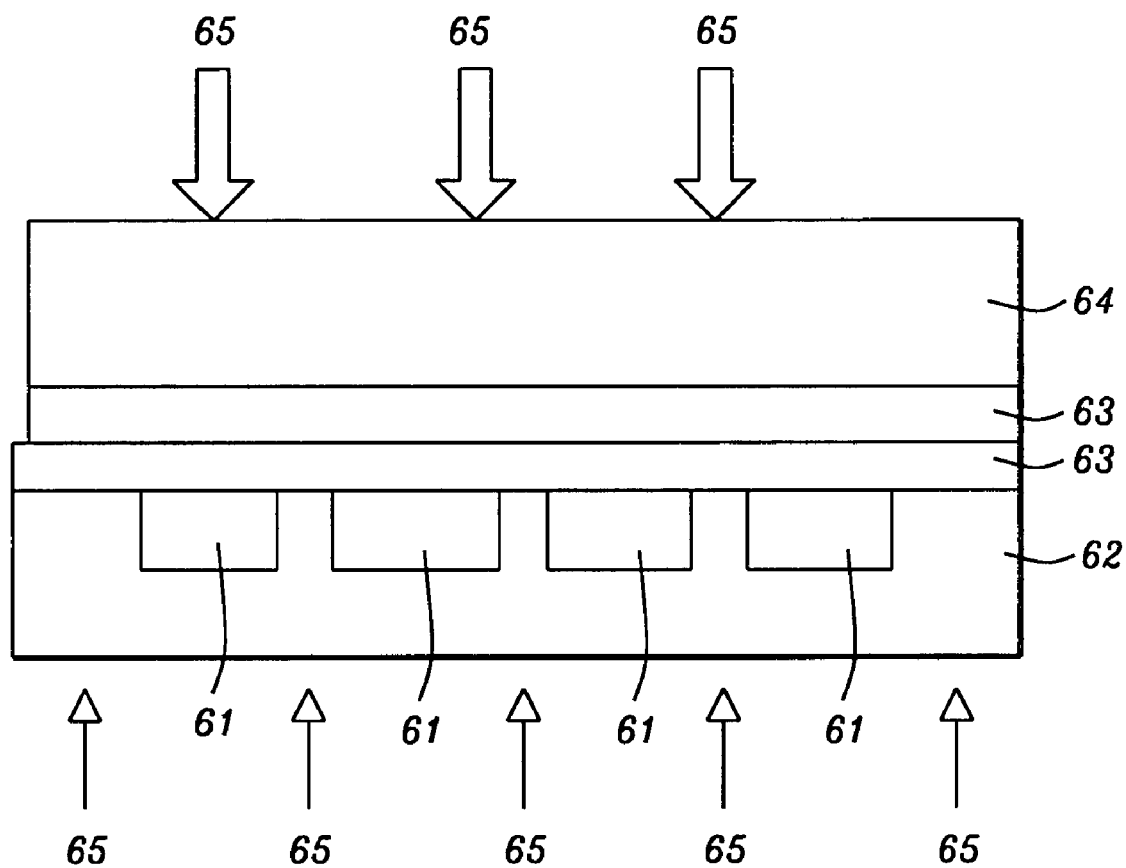
FIGS. 6 and 7 illustrate the process used to manufacture the disposable plastic chip.

To illustrate the process used to manufacture the disposable plastic chip itself, we refer now to FIG. 6. This process begins with the provision of mold 62, whose surface includes an array of depressions 61 that will determine the depth and area of each well. Our preferred material for the mold has been silicon but similar materials such as Ni or other molding materials could also have been used.

At least one sheet of plastic material 63 is placed on the mold surface. Examples of suitable materials include, but are not limited to PC (polycarbonate), PP (polypropylene), and PET (polyester). If thin enough sheets can be obtained and worked, several such sheets may be used (we show two sheets in FIG. 6). Multiple thin sheets are easier to deform than a single thick sheet since the sheets can slide past one another during the deformation process.

A thicker sheet of a different plastic material 64 is now placed over the first sheet(s) 63. Possible material for this include, but are not limited to, PC and PMMA (poly(methyl methacrylate)). A key quality of the second sheet material 64 is that it should have a softening temperature that is about 50 to 100° C. lower than the glass transition temperature of sheet(s) 63.

Figure 7:
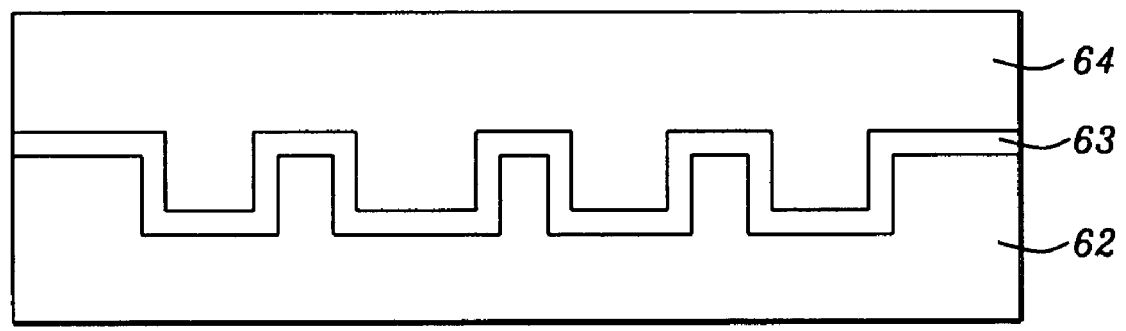

The entire assemblage is now heated to a temperature between the softening temperatures of materials 63 and 64 and uniform pressure 65 of at least 5 KN is applied between plastic sheet 64 and mold 62 thereby causing plastic material 64 to flow. This, in turn, exerts uniform hydrostatic pressure on sheet(s) 63 forcing it to conform to the surface of mold 62 as illustrated in FIG. 7. Then, after cooling to a temperature below which plastic 64 has fully hardened, the two plastic layers 63 and 64 are separated from one another and 63 is removed to be used as described earlier as a disposable multi-chamber chip.

It is important to note that the more standard approach of using a high temperature hydraulic fluid to transmit the applied pressure to sheets 63 was not used because this requires pressure-tight apparatus. The latter is not needed if the medium used to transmit the molding pressure is highly viscous so that it is hard enough to transmit pressure without being confined but soft enough to be able to fully conform to the shape of the mold.

What is claimed is:

1. A process for manufacturing a disposable multi-chamber chip, each chamber having low thermal capacity and good thermal isolation from its neighbors, comprising;
   providing a mold, shaped to form in a surface that conforms to said mold, micro-channels and an array of flat bottomed depressions having a depth no greater than 500 microns;
   placing at least one sheet of a first plastic material, having a first softening temperature, on said mold surface;
   on said first plastic material, placing a sheet of a second plastic material that has a second softening temperature that is less than said first softening temperature;
   heating all materials to said second softening temperature whereby said first plastic material does not melt;
   applying uniform pressure between said plastic sheets and said mold whereby said second plastic material flows, thereby forcing said sheet of first plastic material to conform to said mold surface;
   then cooling until said second plastic material has fully hardened; and
   separating said plastic materials one from another and then removing the sheet of first plastic material from the mold, thereby forming said disposable multi-chamber chip.

2. The process described in claim 1 wherein said mold is silicon or Ni.

3. The process described in claim 1 wherein said first plastic material is selected from the group consisting of PP, PC and PET.

4. The process described in claim 1 wherein said second plastic material is selected from the group consisting of PC and PMMA.

5. The process described in claim 1 wherein said uniform applied pressure is at least 5 KN.

6. The process described in claim 1 wherein said second softening temperature is between about 50 and 100° C. less than said first softening temperature.

7. A process for multi-chamber thermal multiplexing wherein each chamber has low thermal capacity and is thermally isolated from its neighbors, comprising:
   providing a mold, shaped to form in a surface that conforms to said mold, micro-channels and an array of flat bottomed depressions having a depth no greater than 500 microns;
   placing at least one sheet of a first plastic material, having a first softening temperature, on said mold;
   on said first plastic material, placing a sheet of a second plastic material that has a second softening temperature that is less than said first softening temperature;
   heating all materials to said second softening temperature whereby said first plastic material does not melt;
   applying uniform pressure between said plastic sheets and said mold whereby said second plastic material flows, thereby forcing said sheet of first plastic material to conform to said mold surface;
   then cooling until said second plastic material has fully hardened;
   separating said plastic materials one from another and then removing the sheet of first plastic material from the mold, thereby forming an array of chambers in a disposable plastic chip having a top surface;
   placing said plastic chip on an array of heating blocks whose size and spacing matches that of said multi-chamber array;
   using said micro-channels, just filling at least two of said chambers with liquid samples in the form of layers that are no greater than 500 microns thick;
   bonding a cover slip to said top surface so that each liquid sample is completely sealed within its own chamber; and
   then using said heating blocks to heat said liquid samples.

8. The process described in claim 7 wherein said mold is silicon or Ni.

9. The process described in claim 7 wherein said first plastic material is selected from the group consisting of PP, PC, and PET.

10. The process described in claim 7 wherein said second plastic material is selected from the group consisting of PC and PMMA.

11. The process described in claim 7 wherein said uniform applied pressure is at least 5 KN.

12. The process described in claim 7 wherein said second softening temperature is between about 50 and 100° C. less than said first softening temperature.

13. The process described in claim 7 wherein the step of using said heating blocks to heat said liquid samples further comprises simultaneously heating different liquid samples to different temperatures.

14. A process for multi-chamber thermal multiplexing wherein each chamber has low thermal capacity and is thermally isolated from its neighbors, comprising:

providing a mold, shaped to form in a surface that conforms to said mold, micro-channels and an array of flat bottomed depressions having a depth no greater than 500 microns;

placing at least one sheet of a first plastic material, having a first softening temperature, on said mold;

on said first plastic material, placing a sheet of a second plastic material that has a second softening temperature that is less than said first softening temperature;

heating all materials to said second softening temperature;

applying uniform pressure between said plastic sheets and said mold whereby said second plastic material flows, thereby forcing said sheet of first plastic material to conform to said mold surface;

then cooling until said second plastic material has fully hardened;

separating said plastic materials one from another and then removing the sheet of first plastic material from the mold, thereby forming a plurality of shallow chambers, each connected to at least one micro-channel, in a disposable plastic chip having a top surface;

inserting the disposable plastic chip into cavities singly located within an array of heat sinks whose size and spacing matches that of said multi-chamber array;

filling at least two of said chambers with liquid samples in the form of layers that are less than 500 microns thick;

placing an array of heating blocks, whose size and spacing matches that of said multi-chamber array, in contact with said plastic chip top surface to so that each liquid sample is completely isolated within its own chamber;

applying and then maintaining uniform pressure between said heat sink array and said heating block array, thereby ensuring good heat transfer between them and said liquid samples; and then using said heating blocks to heat said liquid samples.

15. The process described in claim 14 wherein said mold is silicon or Ni.

16. The process described in claim 14 wherein said first plastic material is selected from the group consisting of PP, PC and PET.

17. The process described in claim 14 wherein said second plastic material is selected from the group consisting of PC and PMMA.

18. The process described in claim 14 wherein said uniform applied pressure is at least 5 KN.

19. The process described in claim 14 wherein said second softening temperature is between about 50 and 100° C. less than said first softening temperature.

20. The process described in claim 14 wherein the step of using said heating blocks to heat said liquid samples further comprises simultaneously heating different liquid samples to different temperatures.

* * * * *